(12) United States Patent
Krinker et al.

(10) Patent No.: US 10,095,748 B2
(45) Date of Patent: Oct. 9, 2018

(54) PERSONALIZED INFORMATION QUERY SUGGESTIONS

(71) Applicant: Microsoft Technology Licensing, LLC, Redmond, WA (US)

(72) Inventors: Georges Krinker, Olso (NO); John Toews, Oslo (NO); Alexey Zolotukhin, Oslo (NO)

(73) Assignee: Microsoft Technology Licensing, LLC, Redmond, WA (US)

( * ) Notice: Subject to any disclaimer, the term of this patent is extended or adjusted under 35 U.S.C. 154(b) by 316 days.

(21) Appl. No.: 14/195,329

(22) Filed: Mar. 3, 2014

(65) Prior Publication Data
US 2015/0248411 A1    Sep. 3, 2015

(51) Int. Cl.
*G06F 17/30* (2006.01)
*G06F 17/22* (2006.01)

(52) U.S. Cl.
CPC ...... *G06F 17/3053* (2013.01); *G06F 17/2247* (2013.01); *G06F 17/3064* (2013.01)

(58) Field of Classification Search
CPC ............. G06F 17/3053; G06F 17/3064; G06F 17/2247
See application file for complete search history.

(56) References Cited

U.S. PATENT DOCUMENTS

| | | | |
|---|---|---|---|
| 7,461,055 B2 * | 12/2008 | Atcheson | G06F 17/30017 |
| 7,640,511 B1 * | 12/2009 | Keel | G06Q 10/10 |
| | | | 707/999.003 |
| 7,844,599 B2 | 11/2010 | Kasperski et al. | |
| 8,027,990 B1 | 9/2011 | Mysen et al. | |
| 8,204,897 B1 | 6/2012 | Djabarov et al. | |
| 8,219,446 B1 * | 7/2012 | Mowry | 705/14.1 |
| 8,433,705 B1 | 4/2013 | Dredze et al. | |
| 8,504,437 B1 | 8/2013 | Agarwal et al. | |
| 9,171,287 B2 * | 10/2015 | Sorg | G06Q 50/01 |
| 9,177,029 B1 * | 11/2015 | Chau | G06F 17/3053 |

(Continued)

FOREIGN PATENT DOCUMENTS

EP    2690568 A1    1/2014

OTHER PUBLICATIONS

Cucerzan et al., "Query Suggestion based on User Landing Pages", In Proceedings of the 30th Annual International ACM SIGIR Conference on Research and Development in Information Retrieval, 2 pages (Jul. 23, 2007).

(Continued)

*Primary Examiner* — Leslie Wong

(57) ABSTRACT

Personalized search or query suggestions associated with one or more persons and/or content items are provided. A suggestion application learns from user behavior within the suggestion application and presents suggestions for allowing the user to search or navigate to one or more people of particular interest or relevance to the user and for allowing the user to search or navigate to one or more content items associated with people and activities of particular interest or relevance to the user. Two types of suggestions are provided to the user. A first type of suggestion involves suggesting one or more people that may be of particular relevance or interest to the querying user. A second type of suggestion includes a textual suggestion comprised of a person (actor) and an associated action.

20 Claims, 13 Drawing Sheets

(56) References Cited

U.S. PATENT DOCUMENTS

| | | | |
|---|---|---|---|
| 9,183,544 B2* | 11/2015 | Monaco | G06Q 10/107 |
| 2008/0306908 A1* | 12/2008 | Agrawal | G06F 17/278 |
| 2009/0006398 A1* | 1/2009 | Lam | G06Q 30/02 |
| 2009/0281988 A1* | 11/2009 | Yoo | G06F 17/30867 |
| 2010/0161541 A1* | 6/2010 | Covannon | G06F 17/30032 |
| | | | 706/47 |
| 2010/0185509 A1* | 7/2010 | Higgins | G06F 17/30864 |
| | | | 705/14.49 |
| 2011/0276694 A1* | 11/2011 | Swenka | H04L 41/0893 |
| | | | 709/226 |
| 2012/0296743 A1 | 11/2012 | Velipasaoglu et al. | |
| 2013/0124449 A1* | 5/2013 | Pinckney | G06F 17/30867 |
| | | | 706/52 |
| 2013/0124542 A1* | 5/2013 | Lee | G06F 17/30392 |
| | | | 707/751 |
| 2013/0144682 A1* | 6/2013 | Dhara | G06Q 10/04 |
| | | | 705/7.29 |
| 2013/0218967 A1* | 8/2013 | Chau | G06Q 50/01 |
| | | | 709/204 |
| 2014/0040238 A1 | 2/2014 | Scott et al. | |
| 2014/0040245 A1 | 2/2014 | Rubinstein et al. | |
| 2014/0108369 A1* | 4/2014 | Nijjer | H04L 63/08 |
| | | | 707/706 |
| 2014/0274358 A1* | 9/2014 | Hoskins | A63F 13/352 |
| | | | 3/352 |
| 2015/0134389 A1* | 5/2015 | Punera | G06Q 30/016 |
| | | | 705/7.15 |
| 2015/0178397 A1* | 6/2015 | Garg | G06F 17/3053 |
| | | | 707/722 |

OTHER PUBLICATIONS

Kharitonov et al., "Intent Models for Contextualising and Diversifying Query Suggestions", In Proceedings of the 22nd ACM International Conference on Conference on Information & Knowledge Management, pp. 2303-2308 (Oct. 27, 2013).

White et al., "Predicting Short-Term Interests Using Activity-Based Search Context", In Proceedings of the 19th ACM International Conference on Information and Knowledge Management, pp. 1009-1018 (Oct. 26, 2010).

"International Search Report & Written Opinion Received for PCT Application No. PCT/US2015/017884", dated Jun. 19, 2015, 13 Pages.

Hawking, et al., "An Enterprise Search Paradigm Based on Extended Query Auto-Completion. Do We Still Need Search and Navigation?", In Proceedings of the 18th Australasian Document Computing Symposium, Dec. 5, 2013, pp. 18-25.

"International Preliminary Report on Patentability Issued in Application No. PCT/US2015/017884", dated May 24, 2016, 10 Pages.

"Second Written Opinion Issued in PCT Application No. PCT/US2015/017884", dated Feb. 1, 2016, 9 Pages.

* cited by examiner

FIG. 3G

SPREADSHEET DOCUMENT — 380

| DATA COLUMN A | DATA COLUMN B |
|---|---|
| Supplies | 365 |
| Rent | 750 |
| Utilities | 450 |
| Transportation | 345 |

385

PERSONALIZED INFORMATION QUERY SUGGESTIONS

BACKGROUND

Information users and workers gather and process enormous amounts of information for business, education, and pleasure. Typical information users or workers utilize hundreds (or more) of documents, images, electronic communications, data sets and the like. In addition, a typical information user or worker gathers and/or consumes equally large amounts of information through a variety of search mechanisms, for example, file or data search applications, Internet browsing applications, and the like.

In a typical enterprise setting, an information user/worker may work with a number of different persons on a number of projects, each being associated with many documents and other content items. The information user/worker may have different and sometimes complex relationships with the various people, for example, manager-to-report, peer-to-peer, etc. Other types of relationships between people (users) are manifested in social and collaborative connections, for example, electronic communications between people, collaboration on content items (e.g., documents) between people, social commentary and communication between people, and the like. Other types of relationship information for a given user may include relationship information between the user and documents or other content items. For example, various content items may be created, edited and/or viewed by the user, or various content items may be created, edited and/or viewed by other people with whom the user has a relationship, including a person-to-person relationship or a person-to-content item relationship.

According to a typical search mechanism, a user may be able to search on a person or content item, and a flat list of information may be returned that may include a person or item of interest, but may not surface a person or content item to the user of particular interest or relevance to the user. That is, the user may have to parse a list of returned search results for one or more people or content items to find a person or content item that is responsive to the search.

There is a need for query suggestion that provides searching suggestions to a user for searching or navigating to one or more people of particular importance or relevance to the user and for providing suggestions for allowing a user to search or navigate to content items associated with actions or activities of a given person, including the user.

It is with respect to these and other considerations that the present invention has been made.

SUMMARY

This summary is provided to introduce a selection of concepts in a simplified form that are further described below in the detailed description. This summary is not intended to identify key features or essential features of the claimed subject matter, nor is it intended as an aid in determining the scope of the claimed subject matter.

Embodiments of the present invention solve the above and other problems by providing personalized search or query suggestions associated with one or more persons and/or content items. According to embodiments, a suggestion application, is provided that learns from user behavior within the suggestion application and that presents suggestions for allowing the user to search or navigate to one or more people of particular interest or relevance to the user and for allowing the user to search or navigate to one or more content items associated with people and activities of particular interest or relevance to the user. In a first instance, people and content oriented suggestions are generated based on past user behavior with respect to the suggestion application. However, if user behavior history is not established with respect to the suggestion application (e.g., on first use of the suggestion application by the user), then user behavior with respect to other applications and associated people and content items interacted with by the user may be used to provide suggestions to the user that are most relevant and interesting to the user.

In response to a user query, two types of suggestions may be provided to the user. A first type of suggestion involves suggesting one or more people that may be of particular relevance or interest to the querying user. A second type of suggestion includes a textual suggestion comprised of a person (actor) and an associated action. For example, a query input into a suggestion application search field of the text character "P" may return a first suggestion of people named "Paul" or "Pamela" and a second textual suggestion of "edited by Paul" or "emailed to me from Pamela." Suggestions provided to a querying user are determined by selecting top suggestions ranked against other suggestions based on a scoring model applied to the people and actions comprising the suggestions.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

The accompanying drawings, which are incorporated in and constitute a part of this disclosure, illustrate various embodiments of the present invention.

FIG. 3G illustrates an example document or content item navigated to in response to a user selection of a suggested textual actor-action query suggestion.

DETAILED DESCRIPTION

Figure 1:
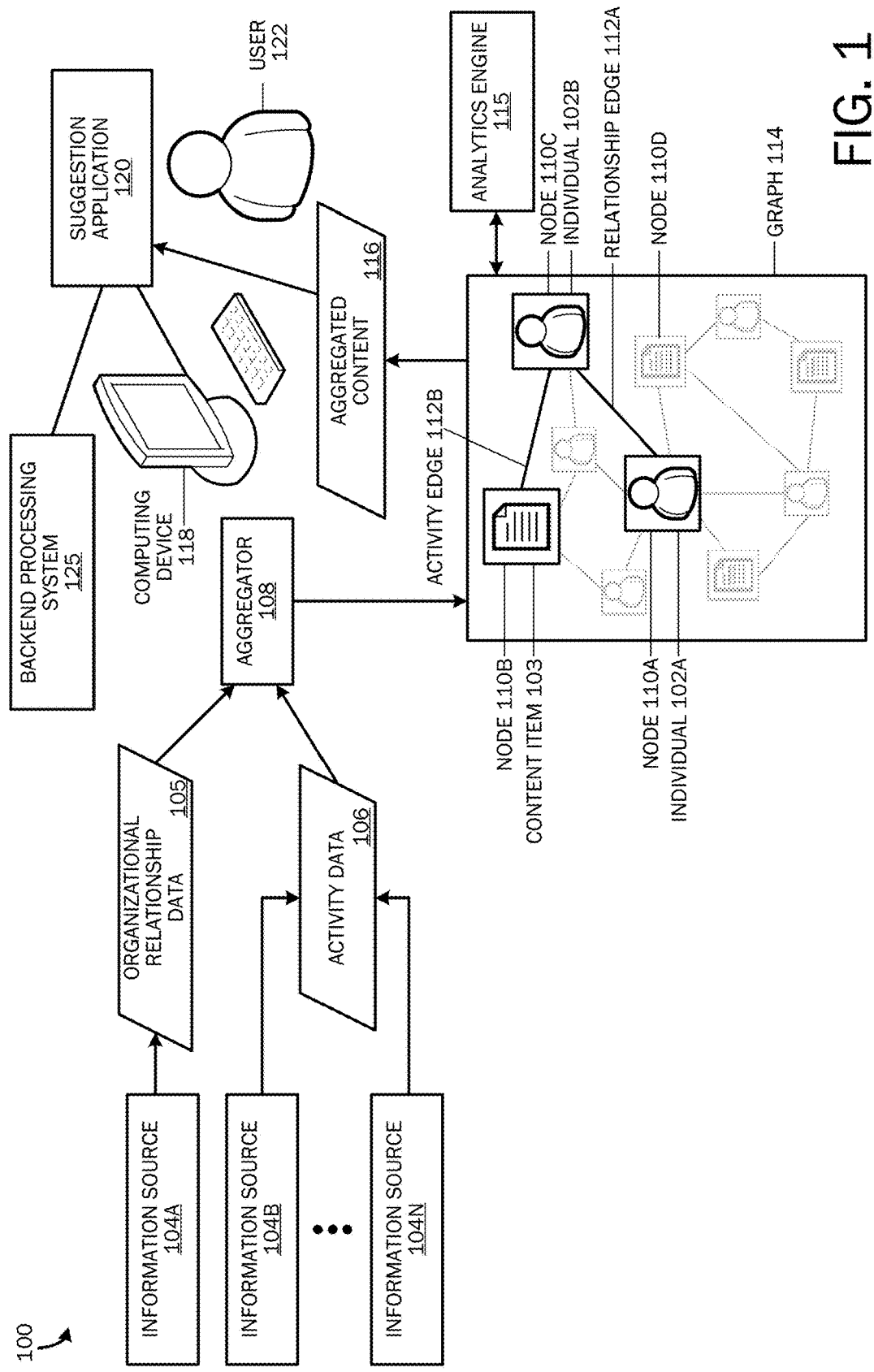
FIG. 1 is a block diagram of one embodiment of a system for providing collected and aggregated information from which personalized query suggestions may be generated.

The following detailed description refers to the accompanying drawings. Wherever possible, the same reference numbers are used in the drawing and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims.

As briefly described above, embodiments of the present invention are directed to providing personalized search or query suggestions associated with one or more persons and content items. In order to gather both people (actors) and action information for developing the two types of query suggestions, briefly summarized above, a suggestion application 120 must obtain information on the querying user's interactions with other people and information on actions or activities associated with the querying user, the other people, and associated content items. As should be appreciated, each time the querying user interacts with a given person, that interaction may be noted and stored for subsequently determining a frequency of interactions between the querying user and other people and a strength of relationship between the querying user and other people, as may be determined based on such factors as how often the querying user interacts with other people, structural relationships between the querying user and other people, for example, manager-to-report, peer-to-peer, and the like, or any of a variety of other types of information, such as organization charts that associate the querying user with one or more people, and the like. Similarly, information may be gathered about content items and actions associated with content items (e.g., editing, viewing, storing, presenting, mailing, and the like), for allowing the generation of actor-action textual suggestions, as described above.

According to one embodiment, information gathered about the querying user, other people, content items, and actions or other activities associated with the querying user, other people, and content items may be gathered and aggregated and may be represented in a graph that graphically represents relationships between people, content items and actions/activities that may be interrogated by the suggestion application for generating query suggestions, as described herein. FIG. 1 is a block diagram illustrating a system architecture 100 for gathering and aggregating information about people, content items and activities which may be used by the suggestion application for providing personalized query suggestions, as described herein.

The system architecture 100 includes an aggregator 108 operable to collect organizational relationship data 105 for various individuals (people) and activity data 106 associated with individuals 102A-B (collectively 102) and content items 103 from a plurality of information sources 104A-N (collectively 104) and store the relationship data 105 and activity data 106 in a graph 114. The information sources 104 may include various types of workloads or information sources such as social networking services, enterprise social network services, online productivity software suites (which may include applications such as, but not limited to, a word processing application, a spreadsheet application, a slide presentation application, a notes taking application, a calendaring application, a video conferencing, an instant messaging application, etc.), collaboration services, communication software, etc.

Activity data 106 may comprise various types of information such as, but not limited to, presence data, interaction data, data associated with communications between people (e.g., emailing, messaging, conferencing, etc.), data associated with an individual's activity stream (e.g., authoring or modifying a document, liking, commenting, following, or sharing a document, commenting on a feed, etc.), trending data, group membership (e.g., inclusion in a distribution list, attendee in a meeting invitation, etc.). Organizational relationship data 105 may comprise various types of information such as, but not limited to, data associated with a project structure or organizational structure (e.g., who an individual works with, works for, is a peer to, directs, manages, is managed by, etc.).

As mentioned above, the organizational relationship data 105 and activity data 106 may be stored in a graph 114. Activities and people relationships may be stored as edges 112A-B (collectively 112), and individuals 102 who act upon a content item 103 or interact with another individual 102, content items 103 that are acted upon may be stored as nodes 110A-C (collectively 110). For example, a node 110 may include an individual 102 (nodes 110A and 110C), a group of individuals, a content item 103 such as a document (node 110B), an email or other communication type, a webpage, etc.

An edge 112 may include various types of actions (i.e., activity edge 112B) (e.g., like, comment, follow, share, authoring, modifying, communication, participation, etc.) and relationships (i.e., relationship edge 112A). Consider for example that an individual 102 "likes" a certain document (i.e., selects a "like" option associated with the document). The individual and the document (content item 103) may be stored as nodes 110 and the "like" selection may be stored as an edge 112.

A relationship edge 112A may include explicit relationships and/or implicit relationships. Explicit relationships may include relationships defined according to an organization structure and data (i.e., organizational relationship data 105). For example, an explicit relationship may include an individual's manager, peers, directs, etc. An explicit relationship may be stored as a relationship edge 112A such as a manager edge, peer edge, directs edge, etc. Implicit relationships may include relationships determined according to activity in one or more workloads (i.e., activity data 106 from one or more information sources 104). For example, an implicit relationship may include an individual 102 following another individual on an enterprise social network service (information source 104), being included on a distribution list with another individual, is a co-author of a document with another individual, emailing (or other type of communication) with another individual, group memberships, commenting on another individual's feed, etc.

Edges 112 may also include inferred edges that may be created between a first individual 102 and a content item 103 acted upon or a person interacted with by a second individual 102 with whom the first individual 102 shares a relationship edge 112A. An inferred edge may also be created between a first individual 102 and a second individual 102 when the second individual acts upon a content item 103 with which the first individual 102 shares an activity edge 112B. For example, a first individual 102 named Ann may share a relationship edge 112A with a second individual 102 named Bob. An inferred edge 112 may be created between Ann and a content item 103 that Bob modifies.

The system 100 may comprise an analytics engine 115 operable to calculate and apply weights on edges 112 according to what activity is performed (e.g., a like, comment, share, follow, email, etc.) and the relationship between a first individual 102 and an individual(s) 102 performing the activity. Weights may also be based on how recently an activity was performed. A weight on a relationship edge 112A may be based on implicit or explicit signals generated through activity on the plurality of workloads, such as an amount and type of activity an individual 102 has with another person, a number of times an individual 102 interacts with a content item 103, the type of interaction, etc. For example, if an individual 102 communicates via email with a first information worker (IW) daily, and is frequently an attendee of meetings that the first IW is also an attendee of, the weight of a relationship edge 112A between the individual 102 and the first IW may be higher than the weight of a relationship edge 112A between the individual 102 and a second IW whom the individual 102 emails less frequently and who share a common "like" of a document on a social network site. A weight on an activity edge 112B may also be based on a type of activity. For example, an "edit" or "share" operation may be considered to be more important than a "like" operation, and thus may have a higher weighting than the "like" operation. An individual's relationship edges 112A and activity edges 112B may be ranked according to their calculated weights.

As described in detail below weights applied to people, content items and activities (or edges) associated with people, content items and activities may be used for scoring people and actor-action suggestions. People and actor-action suggestions may then be ranked, and top X ranked suggestions may be provided to a querying user 122 operating at his/her computing device 118.

The suggestion application 120 illustrated in association with computing device 118 is illustrative of a software application having sufficient computer executable instructions for enabling embodiments of the present invention as described herein. The application 120 may include a thick client application, which may be stored locally on the computing device 118, or may include a thin client application (i.e., web application) that may reside on a remote server and accessible over a network, such as the Internet or an intranet. A thin client application may be hosted in a browser-controlled environment or coded in a browser-supported language and reliant on a common web browser to render the application executable on a computing device 118. The backend processing system 125 is illustrative of one or more local or remote computing systems at which the system 100 or components thereof and at which functionalities of the suggestion application 120 may be maintained and operated. Alternatively, all components of the system 100, application 120 and backend processing system 125 may operate as an integrated client-side application for providing the embodiments of the invention described herein.

According to embodiments, the suggestion application 120 learns from user behavior within the suggestion application and presents suggestions for allowing the user to search or navigate to one or more people of particular interest or relevance to the user and for allowing the user to search or navigate to one or more content items associated with people and activities of particular interest or relevance to the user. According to embodiments, people and content oriented suggestions are first generated based on past user behavior with respect to the suggestion application. However, if user behavior history is not established with respect to the suggestion application (e.g., at first user of the suggestion application by the user), then user behavior with respect to other applications and associated people and content items interacted with by the user may be used to provide suggestions to the user that are most relevant and interesting to the user. In addition, user behavior with respect to other applications may also be used in the case where user behavior within the suggestion application is insufficient or there is a need for a tie breaker between suggestions.

In response to a user query, two types of suggestions are provided to the user. A first type of suggestion involves suggesting one or more people that may be of particular relevance or interest to the querying user. A second type of suggestion includes a textual suggestion comprised of a person (actor) and associated action. For example, a query input into a suggestion application search field of a text character "P" may return a first suggestion of people named "Paul" or "Pamela" and a second textual suggestion of "edited by Paul" or "emailed to me from Pamela." Suggestions provided to a querying user are determined by selecting top suggestions ranked against other suggestions based on a scoring model applied to the people and actions comprising the suggestions.

According to embodiments, people provided as suggestions to the user may be identified because the user previously has followed suggestions identifying those people, or because the user has relationships with those people according to a variety of relationship types (e.g., content collaboration, electronic communications, social network interactions, etc.). Actor-action textual suggestions may be constructed based on actions associated with different people, for example, an action of editing a document associated with an identified person (i.e., the actor).

After the two types of suggestions are generated, graphical representations of the generated suggestions are displayed in a suggestions user interface for showing the suggestions to the user and for allowing the user to select a suggestion for navigating to underlying or associated information. A user selection of a people suggestion may cause immediate navigation to information about the associated person (e.g., "Paul"). A user selection of one of the textual actor-action suggestions may cause immediate navigation to a content item that is the subject of a textual actor-action suggestion. For example, a selection of a textual suggestion "emails to me from Pamela" may cause navigation to an electronic mail message from Pamela or to a document that was transmitted to the user from Pamela.

Figure 2:
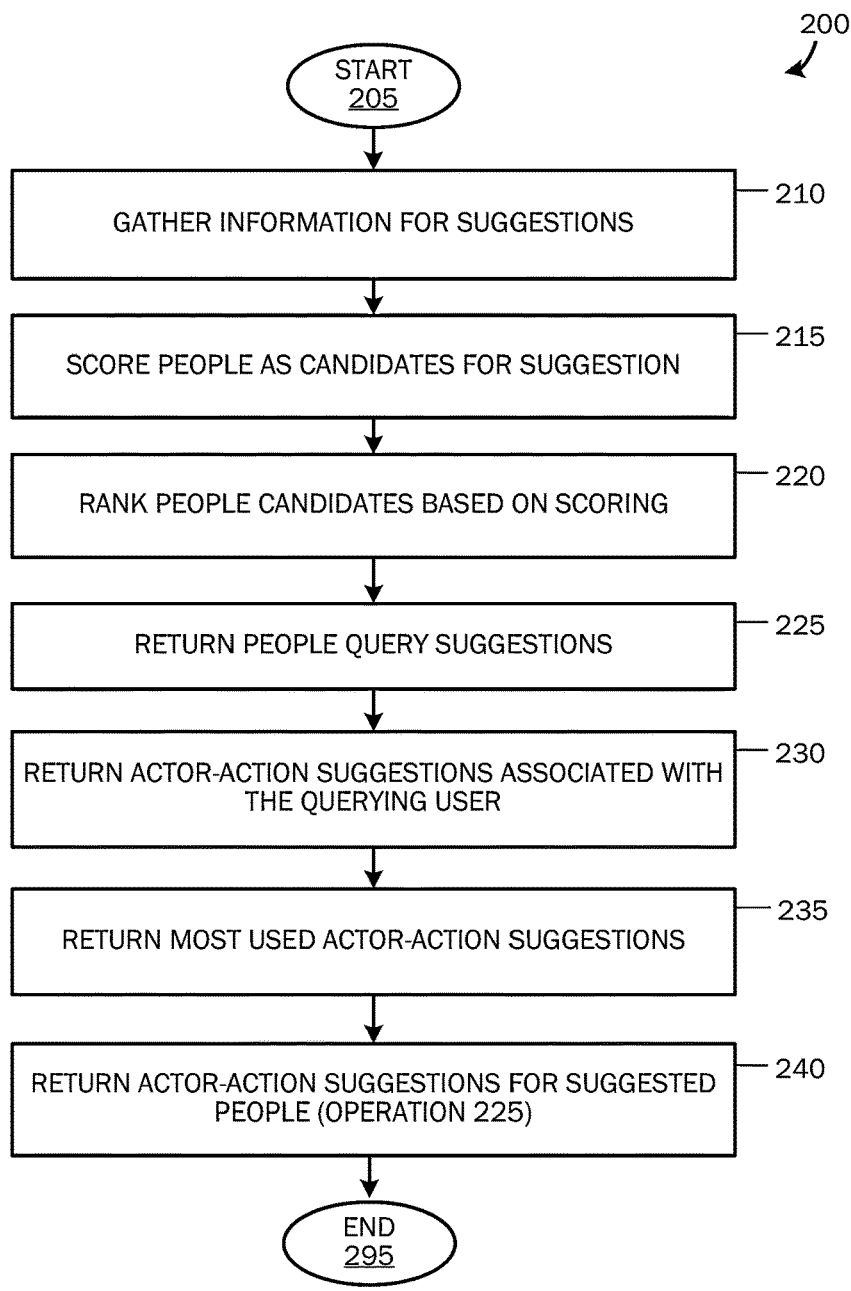
FIG. 2 is a flow chart illustrating a method for providing personalized query suggestions.

FIG. 2 is a flow chart illustrating a method 200 for providing personalized query suggestions. According to embodiments, the two types of query suggestions provided to the user are personalized for the user such that the suggestions for one user may be completely different from suggestions provided to a different user. In order to generate the two types of suggestions, the suggestion application and associated back-end processing systems gather, score and rank information for both types of suggestions so that a top X number of people (actor) suggestions may be provided to the user in response to a query, and so that a top X number of textual actor-action suggestions may be provided to the user.

The method 200 illustrated in FIG. 2 may be performed for generating personalized query suggestions either before a user begins a query or dynamically in response to a query. At start operation 205, the suggestion application 120 begins generation of personalized query suggestions in either case. As described above, at an information gathering operation 210, the suggestion application 120 gathers information on people, content items and actions or activities associated therewith for generating suggestions for a given user. As described above with reference to FIG. 1, information may be gathered, aggregated, graphed and weighted or assisting in a scoring operation that is applied to one or more people that may be the subjects of people query suggestions provided to the querying user.

At scoring operation 215, for the first type of suggestion (i.e., people suggestion), a first scoring factor is computed based on how often the user for which the suggestions are being generated has used suggestions within the suggestion application directed to people from a set of last X people uses. That is, for the last X (e.g., 10) people suggestions selected for acting on by the user, a determination is made as to how often the user has selected on or acted on a suggestion for a particular person.

A next scoring factor is computed based on how much interaction the user has had with a person from interactions with other applications (e.g., electronic mail applications, word processing application, spreadsheet applications, slide presentation applications, and the like). This scoring factor insures personalized suggestions may be generated for the user where user behavior with respect to the first scoring factor is not available. Such would be the case when a given user first utilizes the suggestion application, where no user suggestion behavior has been established. This scoring factor may also serve as a tie-breaker if multiple persons are associated with a same suggestion usage history for the querying user. This scoring factor may be formed by collecting information from other applications the querying user utilizes during his/her daily work life. According to one embodiment, multiple scoring factors may be combined into a single score.

According to one embodiment, when the application 120 needs to rank a set of people from a repository of people, for example, an enterprise directory of people, that match a particular user query, the application may extract a relationship edge (relationship between the querying user and the being-scored person) from the graph 114 (described above with reference to FIG. 1) and the usage weight described above for the first scoring factor for generating the combined score used in ranking a given person against other persons as suggestion candidates. The application 120 ranks people by the final score which is stored in the application and that is composed of the sum of the usage weight and the relationship edge weight (normalized into a decimal value).

According to this embodiment, the score for the relationship edge is normalized to a decimal value so that it contributes less than the user's suggestion usage score. Thus, a person is ranked by how much suggestion usage that person has recently received by the querying user, as well as, weighting of the relationship information between the querying user and the person (e.g., manager versus peer). In case of a tie with other people based on usage, the relationship edge weighting may be used for tie breaking. In the absence of usage information, relationship edge weighting may be used for people ranking.

After scoring of individual people as candidates for suggesting to the querying user as people query suggestions, the candidates may be ranked by the suggestion application 120 in a ranking operation 220 based on the scoring applied to each person. Scored and ranked people information may be stored to cache at (local or backend storage) for subsequent recall. After ranking, a top X number (e.g., top 10) of ranked people may be returned at operation 225 for providing people suggestions to the querying user. According to embodiments, scoring information for those people not ranking high enough for inclusion in an initial return of people query suggestions is not discarded. Such scoring information may be updated from time-to-time based on additional user interactions with those people, and in response to a future query, such people may be presented to the user in a query suggestion.

According to one embodiment, when the user opens the suggestion application 120, the top X (e.g., top 100) people with highest relationship edges (weights) are retrieved from the server (backend) 125 into the local cache at the application 120, and their respective relationship edge weights are utilized that contribute as a factor in their final score for sorting. In this case, certain people are already in the application cache, and the application 120 may simply update the normalized component of the social weight. According to another embodiment, the suggestion application 120 may update that top X people list and the associated weights on a periodic basis (e.g., every 23 hours). This ensures the suggestion application 120 has people (relevant and/or interesting to the querying user) in the cache that may be accessed instantly (upon application opening) without having to query the backend 125. That is, this process gives the application 120 a starting point of people suggestions before additional processing is accomplished or required.

For the second type of querying suggestion (i.e., actor-action suggestion), at operation 230, the suggestion application 120 first returns textual suggestions associated with the querying user as the querying user is more likely to care his/her own content items than content items associated with other people. In this case, the actor portion of the actor/action suggestion is the querying user, and the action portion of the suggestion involves a content item action associated with a particular content item. For example, such a textual suggestion may include "edited by me" wherein selecting such a textual suggestion may cause a navigation to a document edited by the querying user. According to one embodiment, in response to a selection of an actor-action suggestion, the suggestion application 120 may present or navigate the user to a set of results that may contain none, one or many content items. From there, the user may interact with individual items as desired.

According to one embodiment, at operation 235, a most-used suggestion from the querying user's last X suggestion application uses may be provided. According to one embodiment, the suggestion application 120 not only presents the user with one suggestion he/she has used before, but the application may return as many matches as can be fit into the suggestion slots ordered by occurrence (and tie broken by selecting most recent matching uses if necessary). The same is true for suggestions where the user is the actor (operation 230). All matches are returned, ordered by action priority and any remaining space for suggestions may be used in the next suggestion generation operation (operation 235).

As described above, in the case of ties between two textual suggestions, more recent textual suggestions may be provided. That is, according to one embodiment, the application 120 may sort any matches from cache by occurrence (how many times a particular suggestion was used), and in case of ties, the application 120 may look at a last used date for a given suggestion as a tie breaker. When that cache gets full and a new use has to be inserted, the application 120 may replace the least recently used entry.

In addition to textual suggestions associated with the querying user, at operation 240, people returned as part of the people query suggestions, described above at operation 225, may be used for finding actions associated with those people, wherein the returned people are the actors portion of the actor-action textual suggestion, and wherein the action portion of the suggestion involves a content item action associated with a particular content item. That is, if after the above processing, slots for suggestions in the suggestion user interface are still available, the application 120 may use the people suggestions being shown to the user for generating more textual suggestions. In this case, the application 120 may have a prioritized list of actions (e.g., presented to, edited by, liked by, etc.) and a prioritized list of people (from the people suggestions generated above). For each person, ordered by how they are ranked as suggestions, the application 120 may create textual actor-action suggestions. For example, if the first person being suggested is John Doe and the second person being suggested is Jane Smith, the suggestion application 120 may first create all textual suggestions with John Doe (e.g., presented to John Doe, edited by John Doe, etc.), followed by creating textual suggestions for Jane Smith. The application 120 may then move to a third person suggestion, generate textual suggestions with that person as the actor before moving to a next person, and so on.

According to one embodiment, a number of people suggestions and actor-action text suggestions may be generated on a periodic basis and may be stored for recall and presentation, as illustrated and described below with respect to FIGS. 3A-3G. Alternatively, the process of generating people suggestions and actor-action text suggestions, described above, may be performed dynamically as a user enters a query string for obtaining one or more suggestions. The method 200 ends at operation 295.

After the two types of query suggestions described above are generated for a querying user, the querying user is then ready to receive the generated query suggestions in response to his/her query input, and the user may then select a desired suggestion for navigating to people or actions/activities associated with suggested people, including the querying user himself/herself. In FIGS. 3A-3G, example user interfaces with which a querying user may interact with the suggestion application 120 described herein are illustrated. As should be appreciated, the user interfaces and functionality components and content items displayed therein, as illustrated in FIGS. 3A-3G are for purposes of illustration and example only and are not limiting of the vast numbers of user interface components and layouts that may be utilized in accordance with embodiments of the present invention.

Figure 3A:
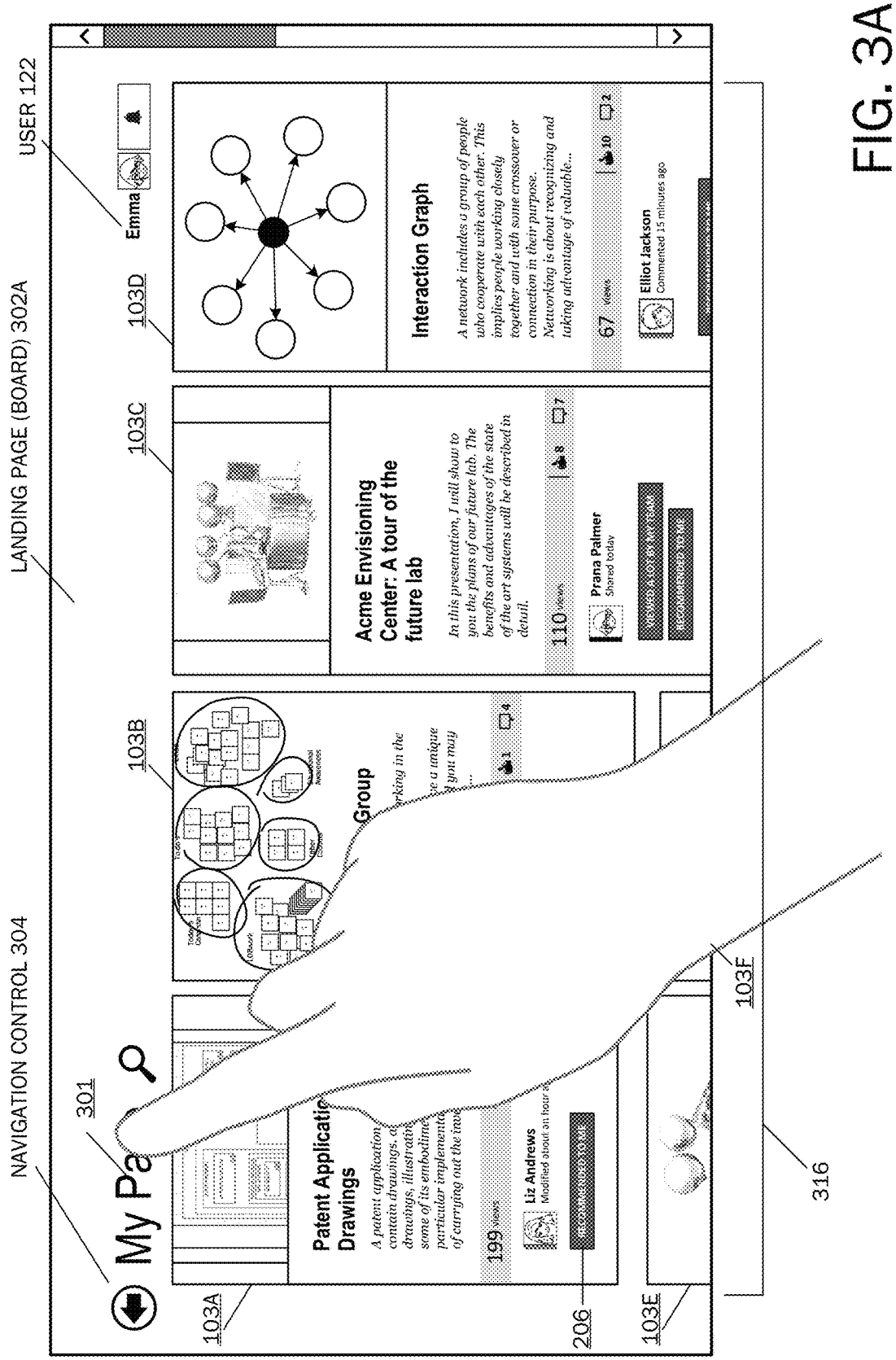
FIG. 3A is an illustration of an example information page comprising a grid of aggregated content items from which a query may be initiated for receiving one or more personalized query suggestions.

FIG. 3A is an illustration of an example information page comprising a grid of aggregated content items from which a query may be initiated for receiving one or more personalized query suggestions. An example information page (also referred to as a landing page) 302A is illustrated that may be displayed on any suitable computing device 118 described above. The landing page 302A may comprise a plurality of content items 103 A-F (collectively 103) displayed in a grid. The content items 103 may be organized and ordered according to a relevance ranking. According to an embodiment, the content items 103 may be displayed as selectable objects that may comprise one or more of a visual representation of the content item 103 (e.g., a thumbnail image or other salient image that is extracted from the content item 103), the title of the content item 103, activity insights (e.g., number of views, a number of likes, a number of followers, a number of comments, etc.), a summary or brief description of the content item, 103, etc. Other information may also be provided, such as an individual 102 the user 122 shares a relationship edge 112A with who has acted on the content item 103, the action taken, and how recently the action took place. For example, as illustrated in FIG. 3A, the first content item 103A shows that an individual 102 Liz Andrews modified the content item 103A "about an hour ago." According to embodiments, a user 122 may navigate to a predefined or to a user-defined query via selection of a navigation control 304. As illustrated in FIG. 3A, a title or header of a page 302A may be a selectable navigation control 304. When selected, the user 122 may select from a predefined query or may enter a search query, for example, a search query for one or more query suggestions described herein.

Figure 3B:
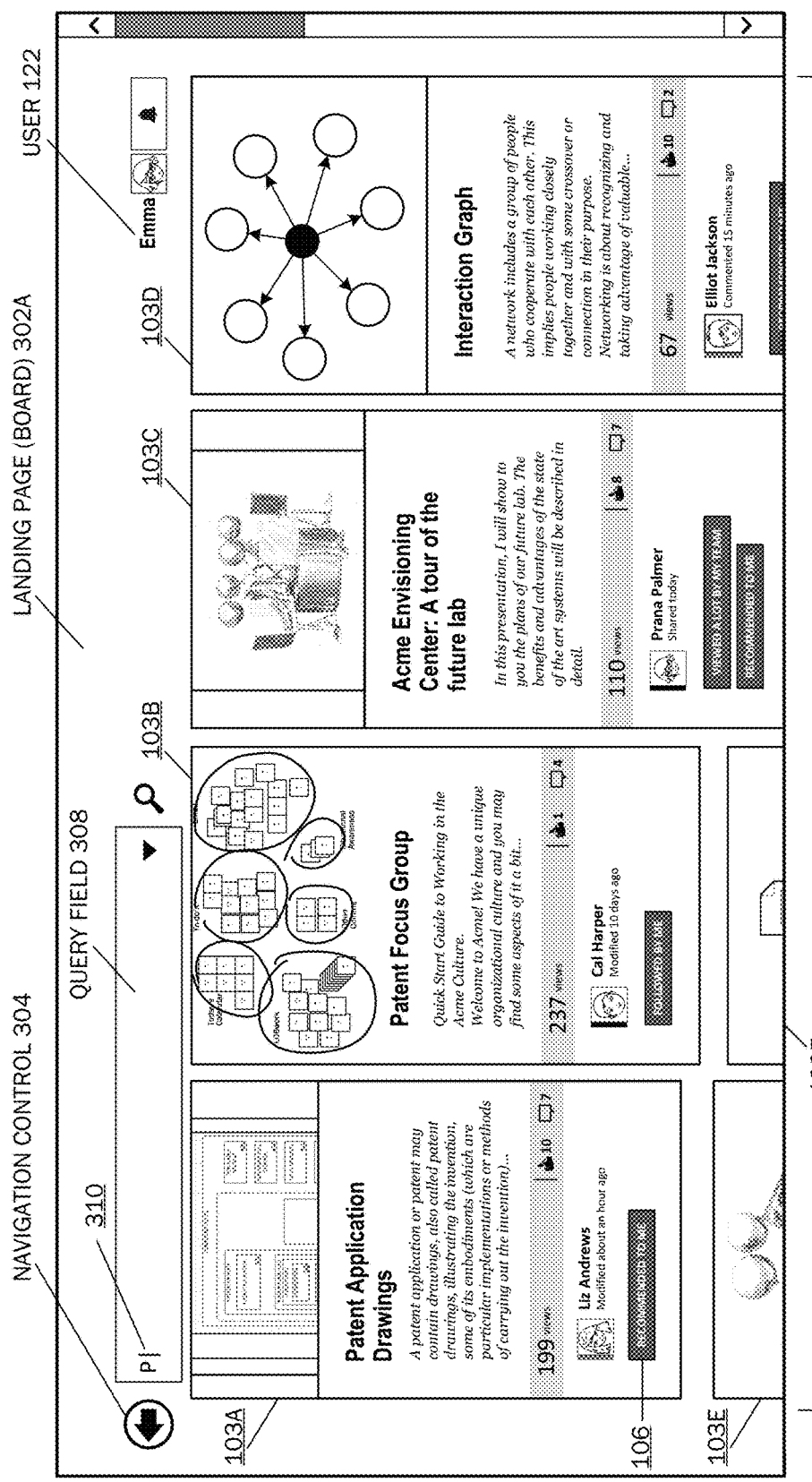
FIG. 3B is an illustration of an example information page comprising a grid of aggregated content items from which a query may be initiated for receiving one or more personalized query suggestions and showing a query or search field for receiving a search or query input from a user.

Referring now to FIG. 3B, the example information page 302A is illustrated showing a query field in which a query may be initiated for receiving one or more personalized query suggestions. In the query field 308, a user may initiate a query for one or more query suggestions by beginning character entry of a natural language text string. In the example shown, the user has entered the textual character "P" in the field 308. According to embodiments, the example character "P" may be part of an eventual word or sentence or the character may be the only character the user intends to enter. As should be appreciated, input of the initial character "P" by the user may be the beginning of a query for a person named Paul Jones, Peter Brown, Pamela Green, Pedro Manerez, Henry Pope, James Peterson, and the like. That is, any person's name (first name or last name) beginning with the character "P" may be a person's name to which the user's query is directed. Likewise, the initial input of the character "P" may be the beginning of a natural language text string being entered by the user for searching on such actions as "presented to me", "provided by Joe", "processed by Sara", "edited by Paul," "viewed by Henry Pope," and the like. That is, any natural language text string that includes the example character "P" may be an intended query being entered by the user. As described herein, as soon as the user enters the first character, for example, the character "P", the suggestion application 120 may search stored suggestions or dynamically generate suggestions, as described above with reference to FIGS. 1 and 2, for provision to the querying user in the user interface page 302A.

Figure 3C:
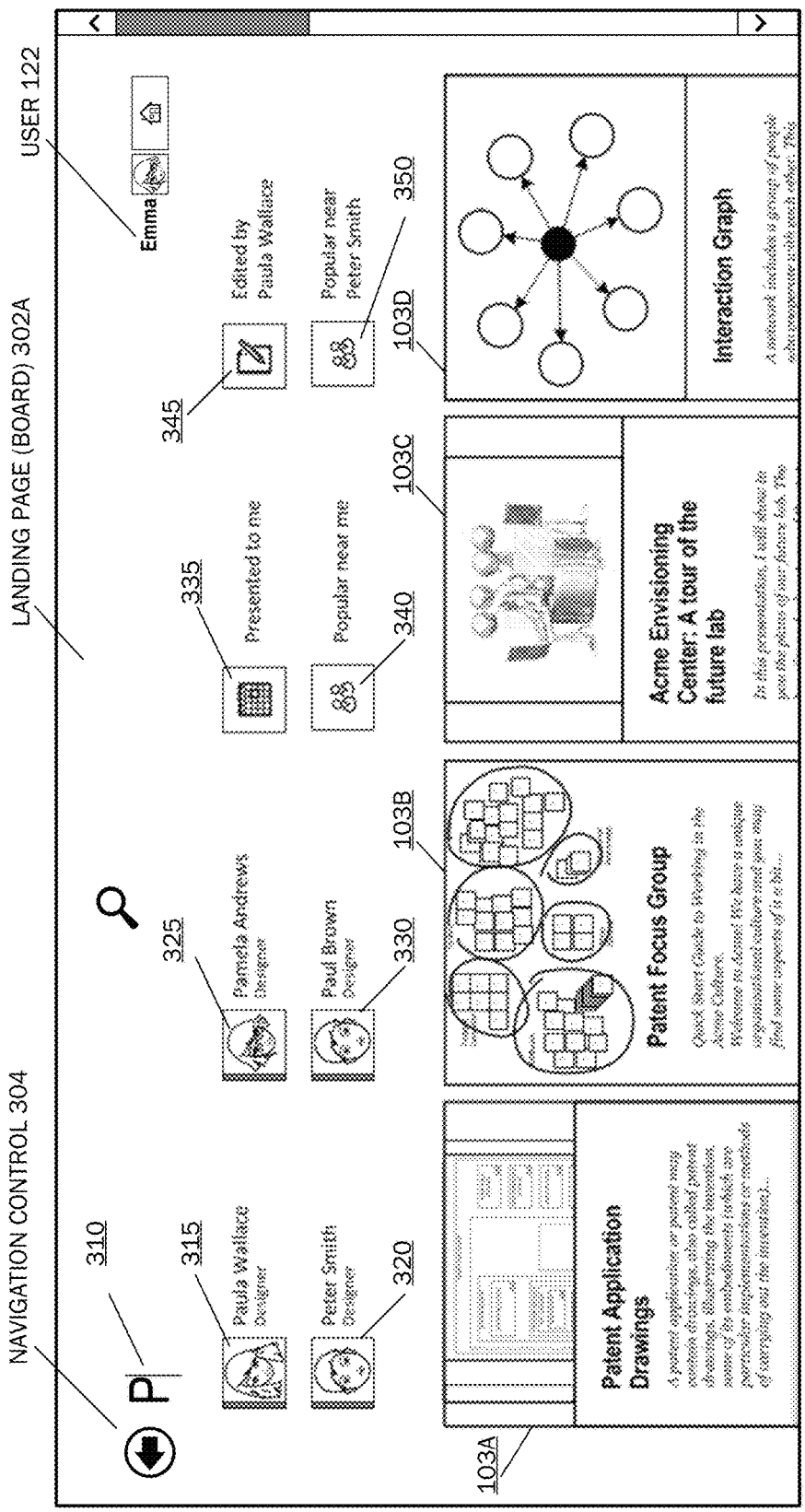
FIG. 3C is an illustration of an example information page showing a number of personalized query suggestions provided to a user in response to a search query.

Referring now to FIG. 3C, in response to the initial input of the example character "P", the suggestion application 120 automatically retrieves a top X (e.g., top 4) people suggestions having names beginning with the entered text character and automatically retrieves a top X ranked actor-action text suggestions being associated with people whose names begin with the entered character or associated with actions associated with the entered character. According to embodiments of the present invention, graphical representations of the retrieved people suggestions and actor-action suggestions may be presented in an array of suggestions in the landing page 302a. According to one embodiment, the people suggestions may be placed in columns and rows in one portion of the landing page, and the actor-action text suggestions may be presented adjacent to the people suggestions in a section portion of the landing page 302a, as illustrated in FIG. 3C.

As illustrated in FIG. 3C, four columns and two rows of people suggestions and actor-action suggestions are presented, and various documents or content items previously presented in the user's landing page 302a are persisted in the display of the landing page beneath a display of the newly displayed people and/or actor-action suggestions. As should be appreciated, the layout illustrated in FIG. 3C is for purposes of example only, and is not limiting of other layouts that may be utilized as desired. For example, a greater number of people suggestions and/or actor-action suggestions may be displayed than are illustrated in FIG. 3C, or according to a different display option, the documents 103a, 103b, 103c and 103d may not be persisted in the display underneath or otherwise relative to the display of the various suggestions. For another example, while, according to one embodiment, both of the two types of suggestions are provided in response to a given query, either type may be provided without providing the other type in response to a given query. In addition, the number of people and/or actor-action suggestions that may be presented to a user may be optimized based on the screen size in use by the user. For example, if the user is using a small form device such as a tablet computer or smart telephone, a smaller number suggestions may be provided and displayed, whereas, if the user is using a large form computer display, a greater number of suggestions may be provided and displayed in response to a user query.

Referring still to FIG. 3C, a first people suggestion 315 is illustrated for an example person "Paula Wallace". As illustrated, an image of the person including a photograph, avatar, or other identifying image may be presented for providing the querying user a quick reference point as to the identity of the returned people suggestion. In addition, textual information such as the person's name, title, or other information may be provided near the provided image. According to embodiments, the image and associated text for the people suggestion is a selectable icon which when selected may cause an immediate navigation to information about the person associated with the suggestion 315, as described below. Other people suggestions 320, 325, 330 are similarly illustrated in FIG. 3C.

Adjacent to the four example people suggestions 315-330 is an array of actor-action suggestions 335, 340, 345, 350. As with the people suggestions, the actor-action suggestions are those suggestions responsive to the query input received from the querying user. For example, as the querying user initially entered the character "P", then actor-action suggestions returned include either actors (people) whose names begin with entered textual character, or actions associated with the actor-action suggestions that begin with the entered character. For example, in response to an entered character of "P", an actor-action suggestion of "presented to me" 335 is provided where the actor is the querying user (i.e., me) and the action associated with the actor is "presented to". This example actor-action suggestion may be associated with a document or other content item presented to the querying user. Selection of the suggestion 335 may cause immediate navigation to the content item, for example, a document, that has been presented to the user at some point in time and that has been ranked sufficiently high to be presented as a first actor-action suggestion in response to the user's initiated query.

Other actor-action suggestions include the "popular near me" suggestion 340, the "edited by Paula Wallace" suggestion 345, and the "popular near Peter Smith" suggestion 350. As described above with respect to FIG. 2, the actor-action suggestions are generated by first matching any "me" (i.e., the querying user) suggestions ordered by action priority, followed by matching any suggestion the querying user has used before (i.e., among his/her X uses) and sorting by occurrence (and tie broken by selecting most recent matching uses if necessary), followed by using people suggestions to generate actor-action suggestions if required.

According to embodiments, each of the actor-action suggestions 335-350 presented to the user, may include an image, photograph, clipart, and the like along with a text string that identifies both the actor and the action associated with the suggestion. For example, if the action associated with a given actor-action suggestion deals with a spreadsheet chart, then a spreadsheet chart icon may be provided as a selectable icon for the suggestion. As should be appreciated, any variety of icons may be utilized for conveying information to the querying user about the nature of the actor-action suggestion.

Referring still to FIGS. 3B and 3C, if the querying user enters a second or more text characters in the entered query, the returned people and actor-action suggestions will be automatically filtered based on the additional query input. For example, as illustrated and described above, in response to entering the character "P", people suggestions and actor-action suggestions beginning with the character "P" are automatically returned. As should be appreciated, hundreds or thousands of people or actor-actions suggestions beginning with the example character "P" may be returned by the suggestion application 102, and a top X ranked items of each type of suggestion may be provided in the user interface 302A.

However, if an additional text character is entered, for example, the character "E" where a resulting query input of "PE" is now entered, the resulting query input will be used for automatically filtering the suggestion results such that people suggestions and actor-action suggestions having the characters "PE" will be returned. Thus, for example, the people "Paula Wallace" 315, "Pamela Andrews" 325, and "Paul Brown" 330 will be automatically filtered out of the people suggestions, and people having names beginning with the characters "PE" will be provided. Likewise, the actor-action suggestions will be filtered to include actor-action suggestions associated with the querying user in association with actions having the characters "PE" in the associated actions, as well as, new actor-action suggestions where the actor have names having the characters "PE" filtered accordingly. As should be appreciated this filtering process may continue as long as the user enters additional characters into the search query.

Figure 3D:
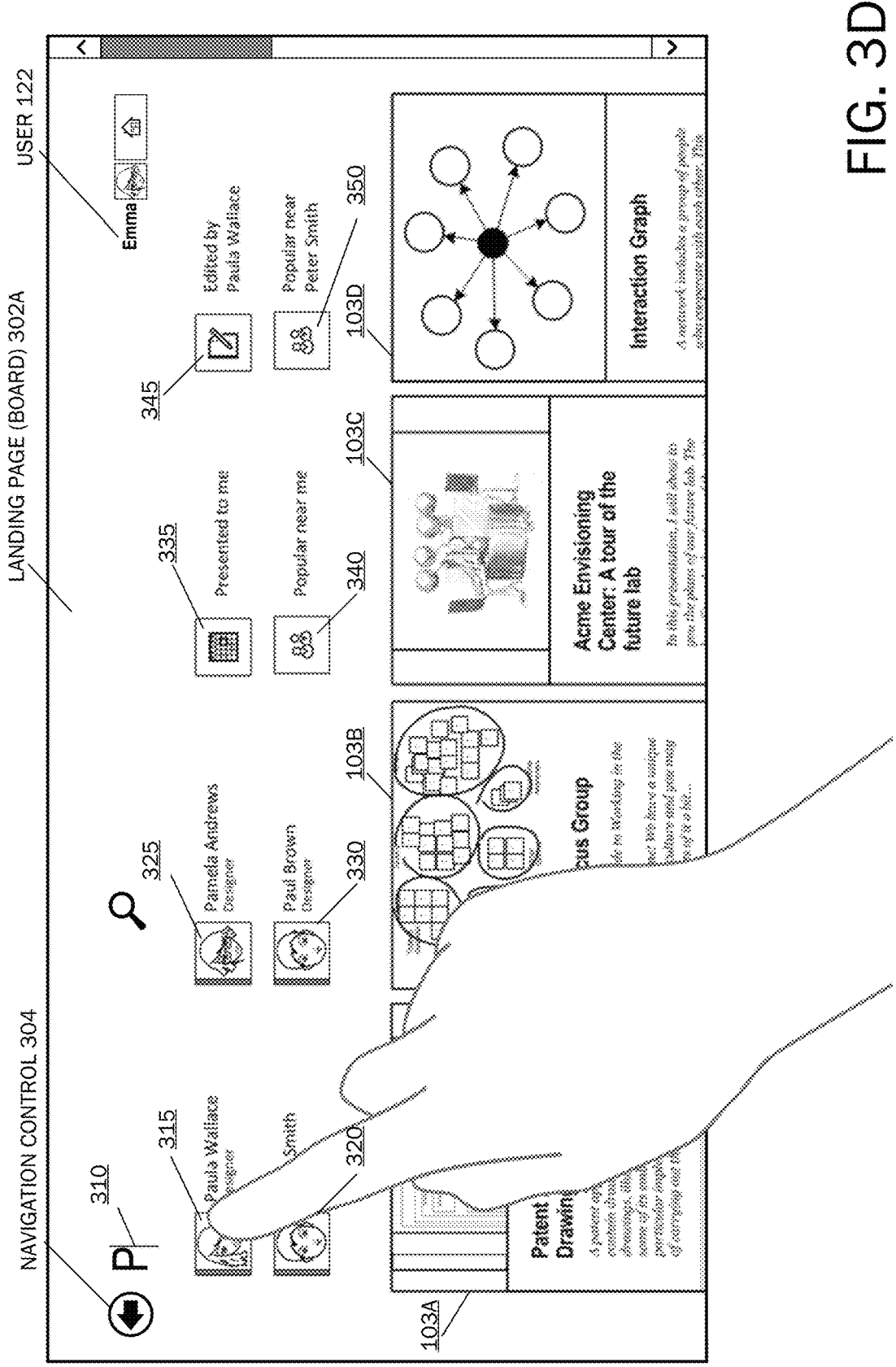
FIG. 3D is an illustration of an example information page showing a number of personalized query suggestions provided to a user in response to a search query and showing a user selection of a provided people query suggestion.

Referring now to FIG. 3D, selection of a given people suggestion 315 is illustrated. The selection illustrated in FIG. 3D is in the form of a user tap gesture on a touch-enabled computing device, but as should be appreciated, any suitable user interaction, for example, keyboard interaction, mouse interaction, electronic pen/ink interaction, voice interaction, gesture interaction, eye tracking interaction, and the like may be utilized for selecting a given suggestion (and for entering query strings, as described herein).

Figure 3E:
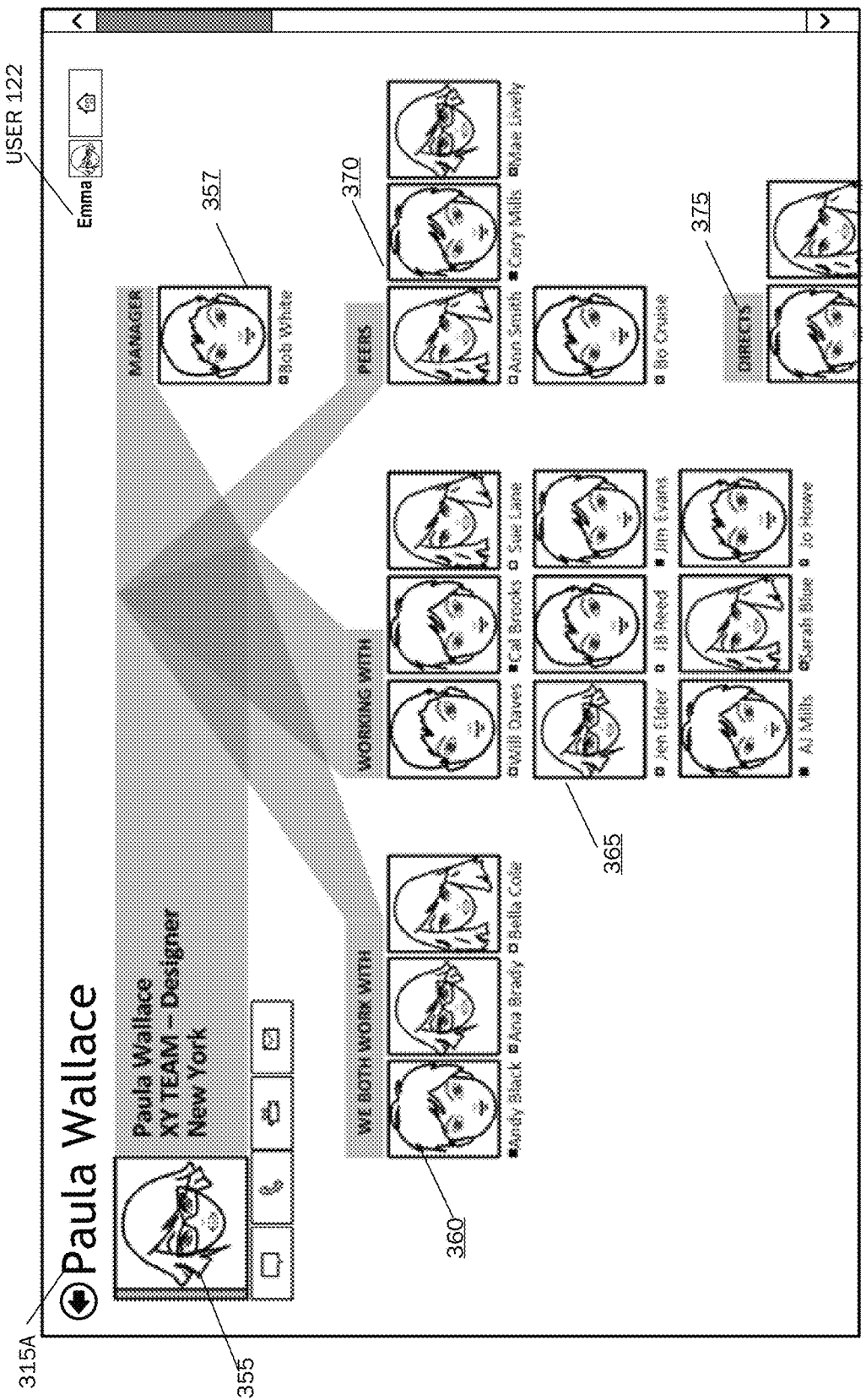
FIG. 3E illustrates on or more information items associated with a particular navigated to person based on a query suggestion for the navigated-to person.

Referring now to FIG. 3E, in response to a selection on the example people suggestion 315, a navigation to information associated with the person for whom the people suggestion 315 was provided may be presented to the querying user. As illustrated in FIG. 3E, an example of organizational chart information for the person associated with the selected people suggestion is illustrated. For example, organizational information 355 for the selected person is provided. Manager information 357 is illustrated, and an array of other people 360 with which both the selected person and her manager work is provided. An array of people 365 working with the selected person 355 is presented. An array of peers 370 of the selected person is presented, and an array of direct reports 375 for the selected person is presented. As should be appreciated, the information illustrated in FIG. 3E is for purposes of example and illustration only. Any number of other information items associated with the selected person, for example, employment history, statistical information, contact information, documents associated with, and the like may presented in a user interface, as is illustrated in FIG. 3E, in response to a selection of the associated people suggestion 315.

Thus, in accordance with embodiments of the present invention, if a user began an initial query by typing the character "P" because the user was interested in retrieving contact information for her colleague "Pamela Wallace," then the people suggestion 315 allows the user to quickly select the associated people suggestion for navigating to information from which the user may retrieve the desired information. Because the suggestions provided by the suggestion application 120 are personalized to the querying user, as described above, then the suggestions and the information that may be navigated to upon selection of the suggestions is more likely to be relevant to or of particular interest to the querying user.

Figure 3F:
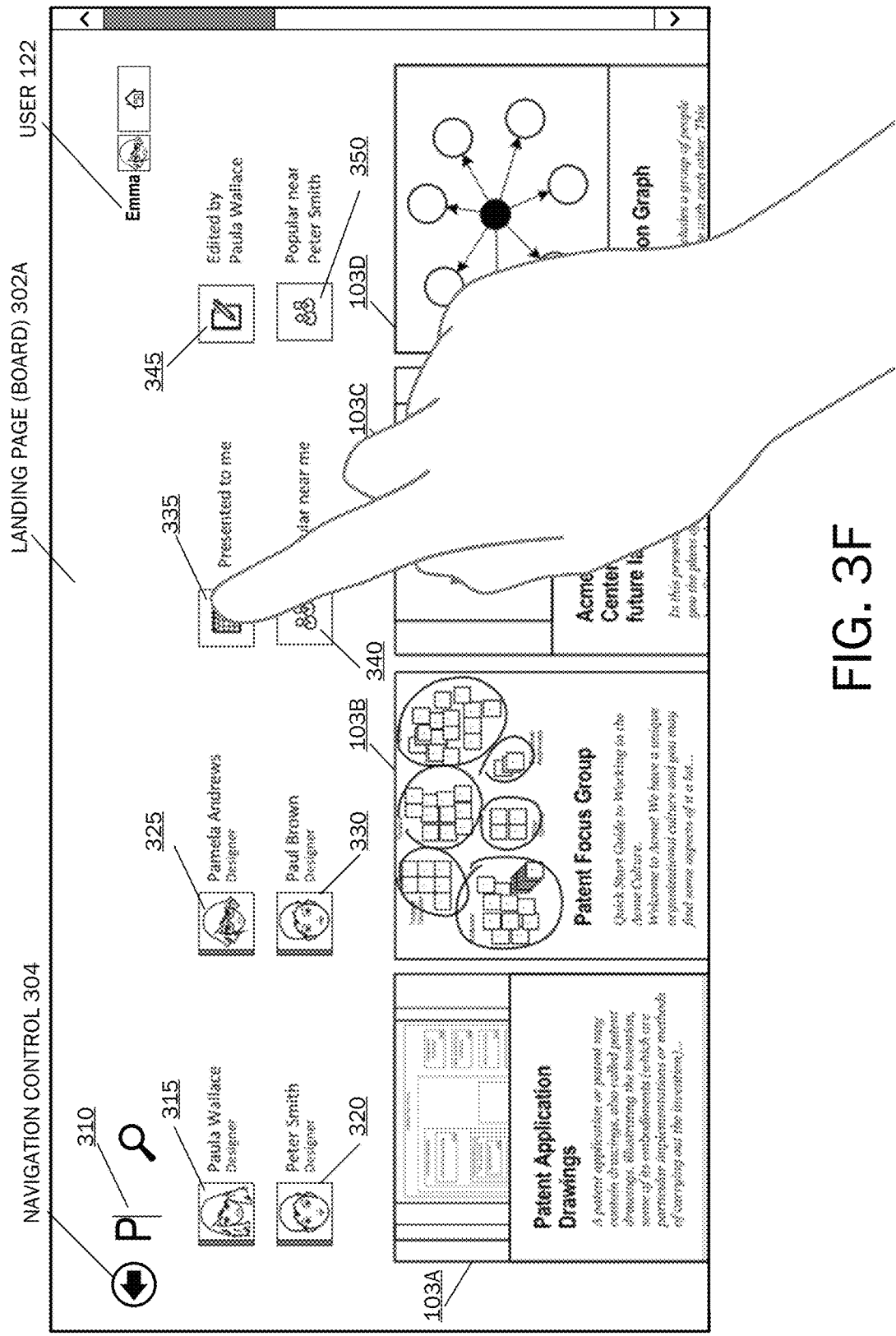
FIG. 3F is an illustration of an example information page showing a number of personalized query suggestions provided to a user in response to a search query and showing a user selection of a textual actor-action query suggestion.

Referring to FIG. 3F, a selection of an actor-action suggestion 335 is illustrated. In response to selection of the actor-action suggestion 335, navigation to a document or other content item that is the subject of the selected suggestion is automatically provided, as illustrated in FIG. 3G. Referring to FIG. 3G, an example document (e.g., a spreadsheet application document 380 having one or more data items 385) is presented to the user. Thus, referring back to FIG. 3F, when the user was presented with the example actor-action suggestion of "presented to me," selection of the suggestion allows for an immediate navigation to the document or other content item that was presented to the user. As described above with respect to people suggestions, because the actor-action suggestions are personalized for the querying user, then there is a greater likelihood that information associated with the provided suggestions is more relevant or interesting to the querying user.

According to embodiments, each time a user selects a people suggestion or actor-action suggestion, scoring associated with the people or actions associated with the selected action is increased. For example, if a user selects a people suggestion 315 associated with a person "Paula Wallace," then the person "Paula Wallace" will be scored higher in a subsequent scoring and ranking process, as described above for determining whether a people suggestion for the selected person should rank higher than other people suggestions. Likewise, a selection of an actor-action suggestion may cause a person associated with the actor-action suggestion or a document or other content item associated with the actor-action suggestion to be scored higher and subsequently ranked higher in future instances of provided suggestions.

While the invention has been described in the general context of program modules that execute in conjunction with an application program that runs on an operating system on a computer, those skilled in the art will recognize that the invention may also be implemented in combination with other program modules. Generally, program modules include routines, programs, components, data structures, and other types of structures that perform particular tasks or implement particular abstract data types.

The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 4:
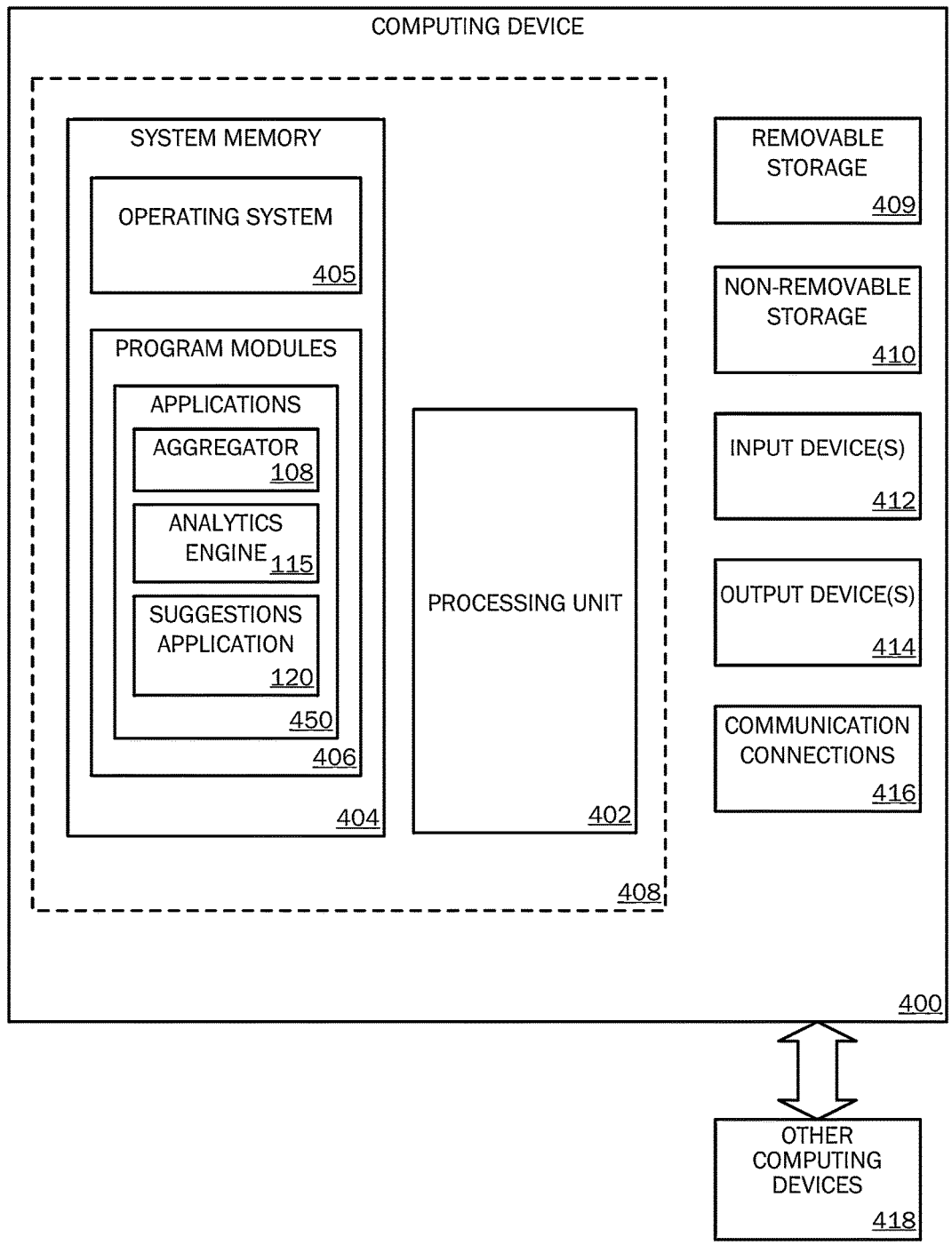
FIG. 4 is a block diagram illustrating example physical components of a computing device with which embodiments of the invention may be practiced.
Figure 5A:
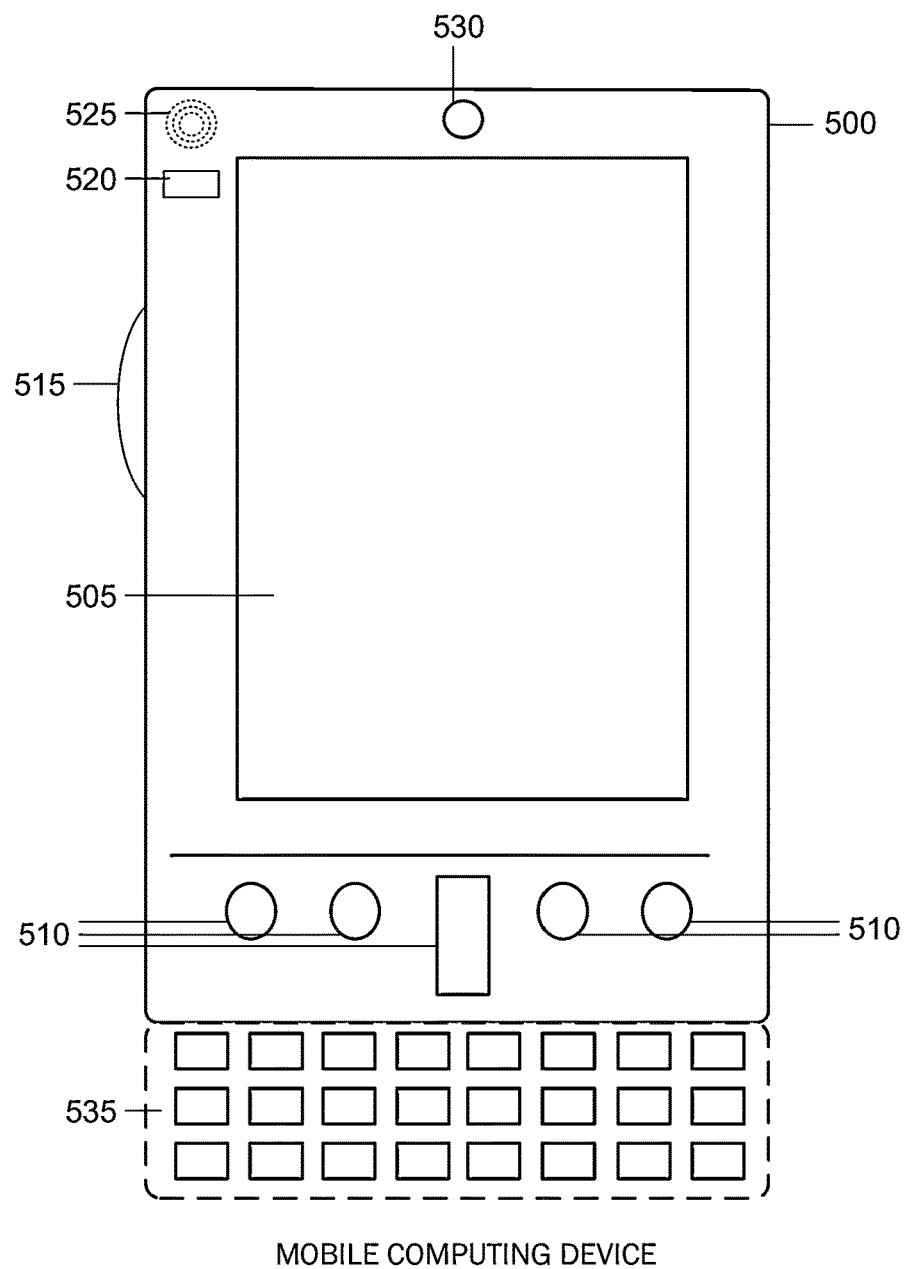
FIGS. 5A and 5B are simplified block diagrams of a mobile computing device with which embodiments of the present invention may be practiced.
Figure 5B:
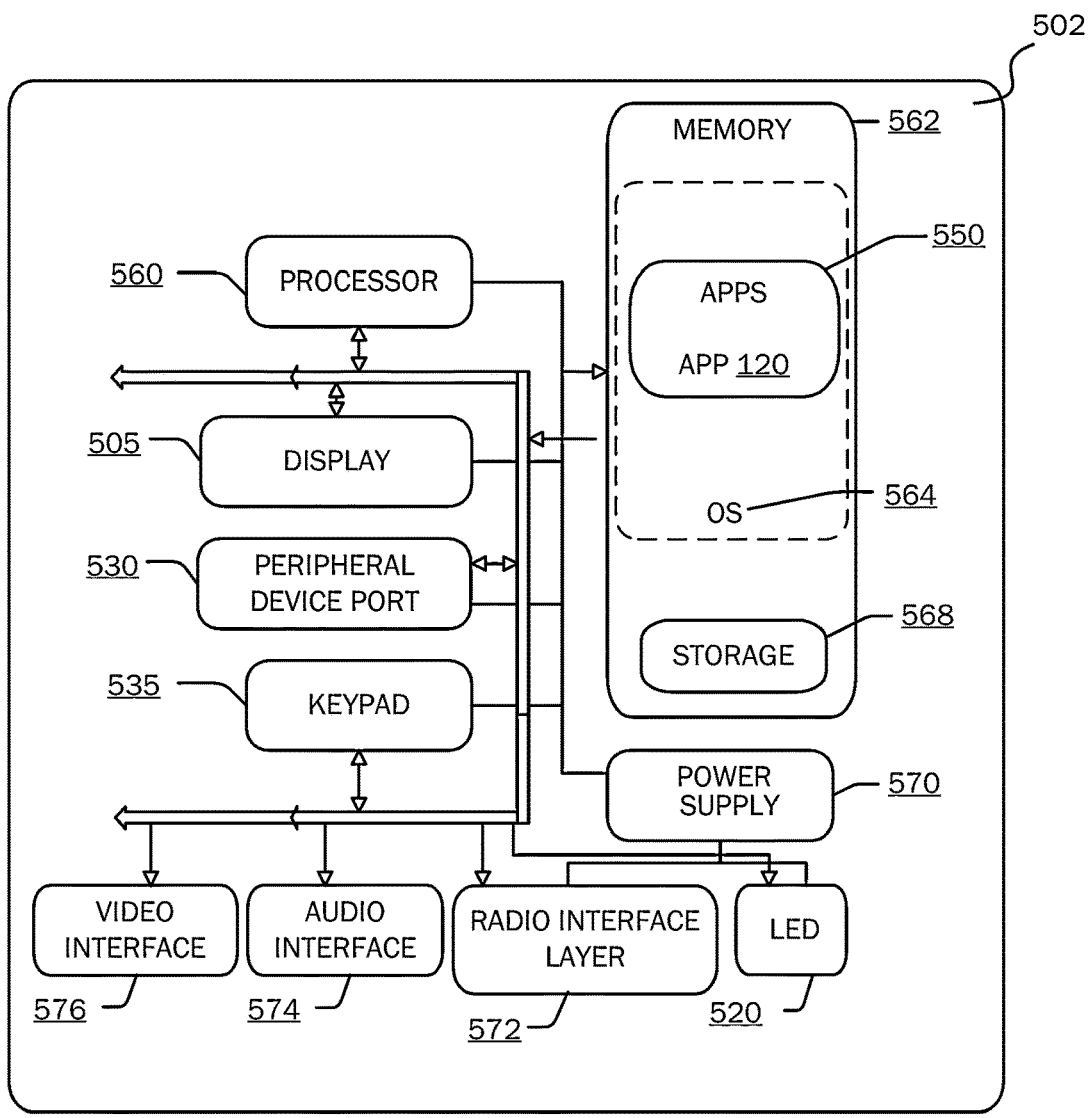
Figure 6:
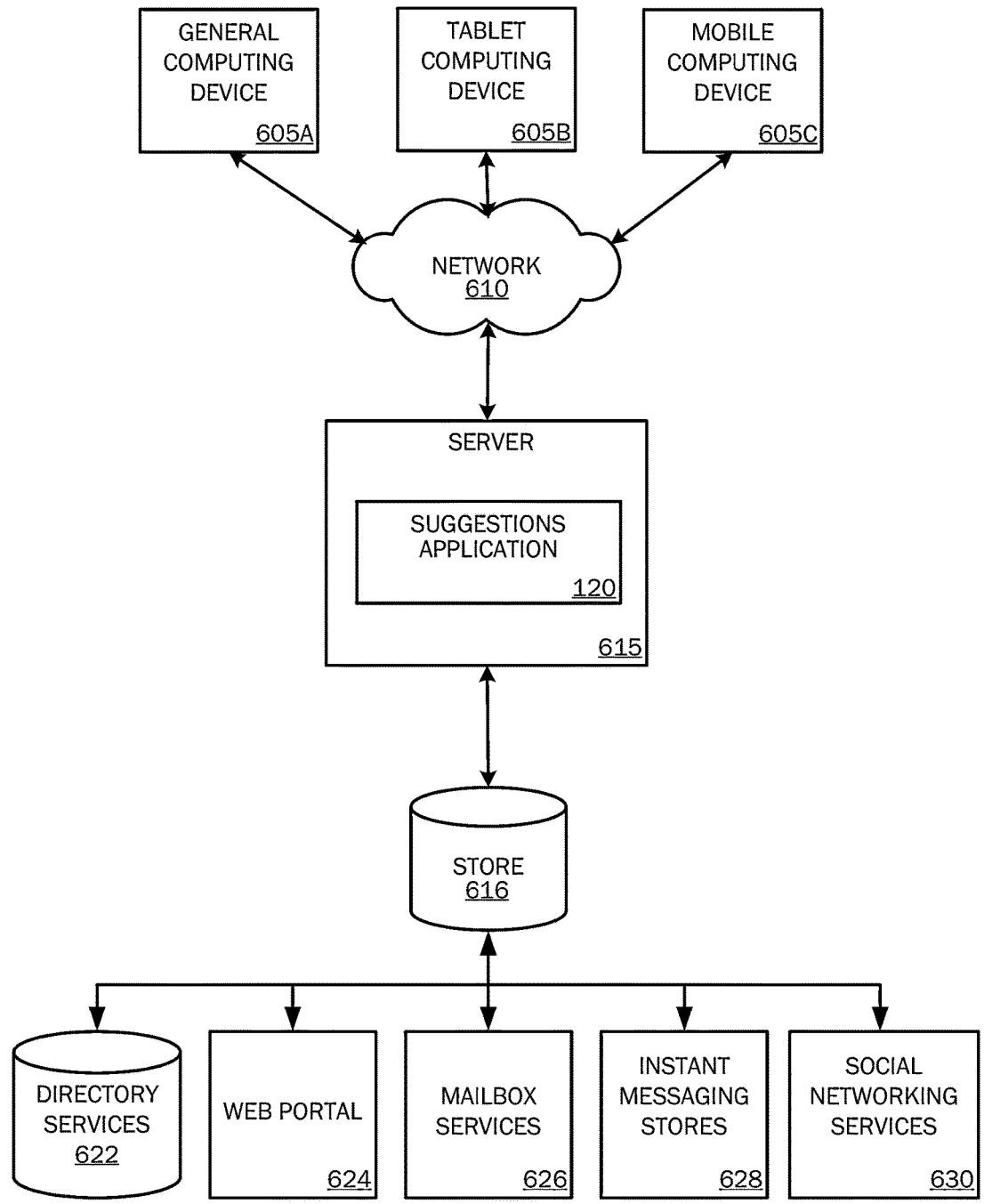
FIG. 6 is a simplified block diagram of a distributed computing system in which embodiments of the present invention may be practiced.

FIGS. 4-6 and the associated descriptions provide a discussion of a variety of operating environments in which embodiments of the invention may be practiced. However, the devices and systems illustrated and discussed with respect to FIGS. 4-6 are for purposes of example and illustration and are not limiting of a vast number of computing device configurations that may be utilized for practicing embodiments of the invention, described herein.

FIG. 4 is a block diagram illustrating physical components (i.e., hardware) of a computing device 400 with which embodiments of the invention may be practiced. The computing device components described below may be suitable for the client device 118 described above. In a basic configuration, the computing device 400 may include at least one processing unit 402 and a system memory 404. Depending on the configuration and type of computing device, the system memory 404 may comprise, but is not limited to, volatile storage (e.g., random access memory), non-volatile storage (e.g., read-only memory), flash memory, or any combination of such memories. The system memory 404 may include an operating system 405 and one or more program modules 406 suitable for running software applications 450 such as the aggregator 108, analytics engine 115, or client application 120. The operating system 405, for example, may be suitable for controlling the operation of the computing device 400. Furthermore, embodiments of the invention may be practiced in conjunction with a graphics library, other operating systems, or any other application program and is not limited to any particular application or system. This basic configuration is illustrated in FIG. 4 by those components within a dashed line 408. The computing device 400 may have additional features or functionality. For example, the computing device 400 may also include additional data storage devices (removable and/or non-removable) such as, for example, magnetic disks, optical disks, or tape. Such additional storage is illustrated in FIG. 4 by a removable storage device 409 and a non-removable storage device 410.

As stated above, a number of program modules and data files may be stored in the system memory 404. While executing on the processing unit 402, the program modules 406 may perform processes including, but not limited to, one or more of the stages of the method 200 illustrated in FIG. 2. Other program modules that may be used in accordance with embodiments of the present invention and may include applications such as electronic mail and contacts applications, word processing applications, spreadsheet applications, database applications, slide presentation applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to providing a personalized view of insights into social activity surrounding a content item 103 may be operated via application-specific logic integrated with other components of the computing device 400 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 400 may also have one or more input device(s) 412 such as a keyboard, a mouse, a pen, a sound input device, a touch input device, etc. The output device(s) 414 such as a display, speakers, a printer, etc. may also be included. The aforementioned devices are examples and others may be used. The computing device 400 may include one or more communication connections 416 allowing communications with other computing devices 418. Examples of suitable communication connections 416 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 5A and 5B illustrate a mobile computing device 500, for example, a mobile telephone, a smart phone, a tablet personal computer, a laptop computer, and the like, with which embodiments of the invention may be practiced. With reference to FIG. 5A, one embodiment of a mobile computing device 500 for implementing the embodiments is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. The display 505 of the mobile computing device 500 may also function as an input device (e.g., a touch screen display). If included, an optional side input element 515 allows further user input. The side input element 515 may be a rotary switch, a button, or any other type of manual input element. In alternative embodiments, mobile computing device 500 may incorporate more or less input elements. For example, the display 505 may not be a touch screen in some embodiments. In yet another alternative embodiment, the mobile computing device 500 is a portable phone system, such as a cellular phone. The mobile computing device 500 may also include an optional keypad 535. Optional keypad 535 may be a physical keypad or a "soft" keypad generated on the touch screen display. In various embodiments, the output elements include the display 505 for showing a graphical user interface (GUI), a visual indicator 520 (e.g., a light emitting diode), and/or an audio transducer 525 (e.g., a speaker). In some embodiments, the mobile computing device 500 incorporates a vibration transducer for providing the user with tactile feedback. In yet another embodiment, the mobile computing device 500 incorporates input and/or output ports, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one embodiment of a mobile computing device. That is, the mobile computing device 500 can incorporate a system (i.e., an architecture) 502 to implement some embodiments. In one embodiment, the system 502 is implemented as a "smart phone" capable of running one or more applications (e.g., browser, e-mail, calendaring, contact managers, messaging clients, games, and media clients/players). In some embodiments, the system 502 is integrated as a computing device, such as an integrated personal digital assistant (PDA) and wireless phone.

One or more application programs 550 may be loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. The system 502 also includes a non-volatile storage area 568 within the memory 562. The non-volatile storage area 568 may be used to store persistent information that should not be lost if the system 502 is powered down. The application programs 550 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500.

The system 502 has a power supply 570, which may be implemented as one or more batteries. The power supply 570 might further include an external power source, such as an AC adapter or a powered docking cradle that supplements or recharges the batteries.

The system 502 may also include a radio 572 that performs the function of transmitting and receiving radio frequency communications. The radio 572 facilitates wireless connectivity between the system 502 and the "outside world," via a communications carrier or service provider. Transmissions to and from the radio 572 are conducted under control of the operating system 564. In other words, communications received by the radio 572 may be disseminated to the application programs 150 via the operating system 564, and vice versa.

The visual indicator 520 may be used to provide visual notifications and/or an audio interface 574 may be used for producing audible notifications via the audio transducer 525. In the illustrated embodiment, the visual indicator 520 is a light emitting diode (LED) and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. In accordance with embodiments of the present invention, the microphone may also serve as an audio sensor to facilitate control of notifications, as will be described below. The system 502 may further include a video interface 576 that enables an operation of an on-board camera 530 to record still images, video stream, and the like.

A mobile computing device 500 implementing the system 502 may have additional features or functionality. For example, the mobile computing device 500 may also include additional data storage devices (removable and/or non-removable) such as, magnetic disks, optical disks, or tape. Such additional storage is illustrated in FIG. 5B by the non-volatile storage area 568.

Data/information generated or captured by the mobile computing device 500 and stored via the system 502 may be stored locally on the mobile computing device 500, as described above, or the data may be stored on any number of storage media that may be accessed by the device via the radio 572 or via a wired connection between the mobile computing device 500 and a separate computing device associated with the mobile computing device 500, for example, a server computer in a distributed computing network, such as the Internet. As should be appreciated such data/information may be accessed via the mobile computing device 500 via the radio 572 or via a distributed computing network. Similarly, such data/information may be readily transferred between computing devices for storage and use according to well-known data/information transfer and storage means, including electronic mail and collaborative data/information sharing systems.

FIG. 6 illustrates one embodiment of the architecture of a system for providing an aggregated view of top ranking content items 103 based on relevance to a user 122, as described above. Content developed, interacted with, or edited in association with the application 120 may be stored in different communication channels or other storage types. For example, various documents may be stored using a directory service 622, a web portal 624, a mailbox service 626, an instant messaging store 628, or a social networking site 630. The application 120 may use any of these types of systems or the like for providing query suggestions, as described herein. A server 615 may provide the application 120 to clients 118. As one example, the server 615 may be a web server providing the functionality of the application 120 over the web. The server 615 may provide the functionality of the application 120 over the web to clients 118 through a network 610. By way of example, the client computing device 118 may be implemented and embodied in a personal computer 605A, a tablet computing device 605B and/or a mobile computing device 605C (e.g., a smart phone), or other computing device. Any of these embodiments of the client computing device may obtain content from the store 616.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed is:

1. A method of personalizing query suggestions, comprising:
receiving a query via computer-enabled query application;
determining a first score for each of one or more people, wherein the first score is based on a frequency with which a querying user has selected each of the one or more people from previous query suggestions produced by the query application;
determining a second score for each of the one or more people based on interactions between the querying user and the one or more people in one or more applications other than the query application;
combining the first score and the second score to form a combined score, wherein the second score contributes less than the first score to the combined score;
ranking each of the one or more people based on the combined score;
providing, based on the ranking, a people query suggestion in a query suggestion user interface; and
providing an actor-action query suggestion in the query suggestion user interface for receiving information about a content item action associated with a person corresponding to the content item action.

2. The method of claim 1, wherein receiving a query via a computer-enabled query application includes receiving a textual input;
wherein providing the people query suggestion includes providing a people query suggestion matching the textual input; and
wherein providing the actor-action query suggestion includes providing an actor-action query suggestion matching the textual input.

3. The method of claim 2, in response to receiving an additional textual input, updating the provided people query suggestion to provide an updated people query suggestion, and updating the provided actor-action query suggestion to provide an updated actor-action query suggestion based on the additional textual query input.

4. The method of claim 1, further comprising receiving a selection of the people query suggestion and automatically providing information about the corresponding person in a computer-enabled user interface.

5. The method of claim 4, further comprising receiving a selection of the actor-action and automatically navigating to a content item associated with the content item action.

6. The method of claim 4, in response to receiving the selection of the people query suggestion, increasing a score associated with a person for which the people query suggestion is provided, the increased score being used for subsequent ranking applied to the person for which the people query suggestion is provided.

7. The method of claim 6, in response to receiving the selection of the actor-action query suggestion, ranking the actor-action query higher for subsequent provision as an actor-action query suggestion.

8. The method of claim 1, further comprising providing an additional actor-action query suggestion for content item actions associated with the querying user.

9. The method of claim 1, further comprising providing an additional actor-action query suggestion based on a most used actor-action query suggestion from the querying user's last X uses, where X is a number greater than or equal to one.

10. The method of claim 9, wherein providing the additional actor-action query suggestion comprises providing the additional actor-action query suggestion based on the most used actor-action query suggestion and on content item actions corresponding to a person for which the people query suggestion is provided.

11. The method of claim 1, further comprising prior to combining the first and the second scores, normalizing the second score to a decimal value such that the second score contributes less to the combined final score.

12. A computer readable storage device on which is stored computer executable instructions which, when executed by a computer, perform a method of personalizing query suggestions, comprising:
receiving a query via computer-enabled query application;
determining a first score for each of one or more people, wherein the first score is based on a frequency with which a querying user has selected each of the one or more people from previous query suggestions produced by the query application;
determining a second score for each of the one or more people based on interactions between the querying user and the one or more people in one or more additional applications;
combining the first score and the second score to form a combined score, wherein the second score is normalized to a decimal value when combined with the first score;
ranking each of the one or more people based on the combined score; and
providing, based on the ranking, a people query suggestion, wherein providing the people query suggestion includes providing the people query suggestion for a top ranked of the one or more people.

13. The computer readable storage device of claim 12, further comprising providing an actor-action query suggestion for querying information about a content item action associated with a person corresponding to the content item action.

14. The computer readable storage device of claim 13, wherein receiving a query via a computer-enabled query application includes receiving a textual input;
wherein providing the people query suggestion includes providing a people query suggestion matching the textual input; and
wherein providing the actor-action query suggestion includes providing an actor-action query suggestion matching the textual input.

15. The computer readable storage device of claim 13, in response to receiving an additional textual input, updating the provided people query suggestion to provide an updated people query suggestion, and updating the provided actor-action query suggestion to provide an updated actor-action query suggestion based on the additional textual query input.

16. The computer readable storage device of claim 13, further comprising at least one of:
receiving a selection of the people query suggestion and automatically providing information about the corresponding person in a computer-enabled user interface; or
receiving a selection of the actor-action and automatically navigating to a content item associated with the content item action.

17. A computer system comprising a computer processor in communication with computer-readable storage device, the computer-readable storage device storing instructions that, when executed, perform a method, the method comprising:
- receiving a query via computer-enabled query application;
- determining a first score for each of one or more people, wherein the first score is based on a frequency with which a querying user has selected each of the one or more people from previous query suggestions produced by the query application;
- determining a second score for each of the one or more people based on interactions between the querying user and the one or more people in one or more additional applications;
- combining the first score and the second score to form a combined score, wherein the second score contributes less than the first score to the combined score;
- ranking each of the one or more people based on the combined score; and
- providing, based on the ranking, a people query suggestion, wherein providing the people query suggestion includes providing the people query suggestion for a top ranked of the one or more people.

18. The computer system of claim 17, wherein the method further comprises prior to combining the first and the second scores, normalizing the second score to a decimal value such that the second score contributes less to the combined score.

19. The computer system of claim 17, wherein the method further comprises providing an actor-action query suggestion for querying information about a content item action associated with a person corresponding to the content item action.

20. The computer system of claim 19, wherein the method further comprises at least one of:
- receiving a selection of the people query suggestion and automatically providing information about the corresponding person in a computer-enabled user interface; or
- receiving a selection of the actor-action and automatically navigating to a content item associated with the content item action.

* * * * *